United States Patent Office 2,858,310
Patented Oct. 28, 1958

2,858,310

NEW TRIAZINE COMPOUNDS

Christoph J. Grundmann and Alfred Kreutzberger, Columbus, Ohio, assignors to Olin Mathieson Chemical Corporation, a corporation of Virginia No Drawing. Application May 8, 1956
Serial No. 583,369

3 Claims. (Cl. 260—249.5)

This invention relates to new compositions of matter, 4-trichloromethyl-6-amino-1,3,5-triazines having a hydrocarbon substituent in the 2-position of the triazine ring.

The novel trichloromethylamino-triazines may be synthesized from readily accessible starting materials in two stages according to the following equation in which R is a lower alkyl or lower aryl radical:

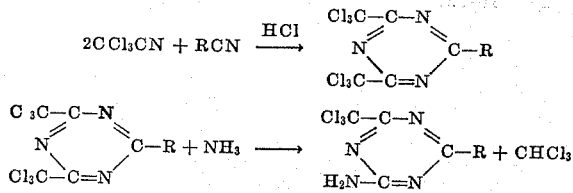

The first reaction may be carried out using the method of Dachlauer in German Patent 682,391 of 1937. Trichloroacetonitrile and an aliphatic or aromatic hydrocarbon nitrile, for example, acetonitrile or benzonitrile, mixed in the molar proportions of 2:1 are saturated with dry gaseous hydrogen chloride at room temperature and allowed to stand for a few days until the 4,6-bis-trichloromethyl-1,3,5-triazine crystallizes. The product is filtered and suitably recrystallized from alcohol.

The bis-trichloromethyltriazine is converted to the trichloromethylaminotriazine by treatment with ammonia for one to two hours. The reaction may be carried out in water or alcohol as suitable media, advantageously at room temperature or slightly above. On carrying out the reaction at an elevated temperature, for example 100° C., the reaction time is not appreciably shortened and somewhat lower yields are obtained due to the formation of by-products.

It is surprising that under the conditions recited, only one trichloromethyl group is replaced by the —NH$_2$. Even at 100° C., no diamino compound is formed. Thus the preparation of the trichloromethyl-monoamino compound is peculiarly simple and convenient.

The new 2-hydrocarbon substituted trichloromethyl-aminotriazines are relatively high molecular weight crystalline solids which are insoluble in water but soluble in the common organic solvents. For example, 2-methyl-4-trichloromethyl-6-amino-1,3,5-triazine crystallizes from either water or alcohol and is removed by any suitable means, such as by filtration. It may be recrystallized from methanol-water solution and has a melting point of 158–159° C. It is insoluble in water and petroleum ether, soluble in chloroform, acetone, methanol, benzene and less soluble in carbon disulfide. The 2-phenyl-4-trichloromethyl-6-amino-1,3,5-triazine, for example, may be recrystallized from acetone-water solutions and has a melting point of 175° to 176° C. It is insoluble in water and petroleum ether, soluble in ethanol, methanol, acetone, chloroform, carbon tetrachloride, pyridine, dioxane, glacial acetic acid, ethyl acetate, toluene, benzene and slightly soluble in carbon bisulfide.

Other 2-hydrocarbon substituted trichloromethyl-aminotriazines may be prepared by reacting the appropriate hydrocarbon nitrile with trichloroacetonitrile. Suitable hydrocarbon nitriles may be, for example, propionitrile, butyronitrile, isobutyronitrile, the tolunitriles and the dimethylbenzonitriles.

The new compounds are useful as modifiers of amine-formaldehyde resins, especially those of melamine and formaldehyde. As illustrated by Example IV, these compounds generally cause amine-formaldehyde resins to be insoluble in lacquer solvents. Coating compositions utilizing such insoluble resins are useful for laboratory table tops, counter tops, or any other surfaces which may come in contact with said solvents.

The following examples illustrate the preparation of our novel compositions.

Example I

Dry hydrogen chloride was passed during a period of two days through a mixture of 226 grams of trichloroacetonitrile and 31 grams of acetonitrile. The product began to separate after one day. After standing four days the excess hydrogen chloride was removed by aspiration and the filtered crude product was recrystallized from alcohol. A yield of 185 grams or 73.7 percent of the theoretical quantity was obtained. Its melting point was 97° C.

A mixture of 25 ml. of concentrated aqueous ammonia (28 percent) and 11 grams of 2-methyl-4,6-bis-trichloromethyl-1,3,5-triazine was shaken for two hours. The solid was removed by filtration and the filter cake recrystallized from a mixture of methanol and water containing 45 percent of the latter. A 79 percent yield of white glittering leaflets melting with decomposition at 158–159° C. was obtained. Analysis showed 26.45 percent carbon, 2.43 percent hydrogen and 46.80 percent chlorine compared with theoretical values of 26.40 percent carbon, 2.21 percent hydrogen and 46.76 percent chlorine.

Example II

From 180 grams of trichloroacetonitrile and sufficient acetonitrile to provide a molar ratio of 2:1, treated by the procedure of Example I, 185 grams or 87 percent of theoretical yield of 2-methyl-4,6-bis-trichloromethyl-1,3,5-triazine was obtained. Its melting point was 97° C.

A mixture of 20 ml. of a 17 percent ethanolic solution of ammonia and 11 grams of 2-methyl-4,6-bis-trichloromethyl-1,3,5-triazine was shaken for one hour. The crude product was removed by filtration and recrystallized from methanol and water. A yield of 45 percent of 2-methyl-4-trichloromethyl-6-amino-1,3,5-triazine was obtained. The product analyzed the same as that of Example I.

Example III

A stream of dry hydrogen chloride was passed through a mixture of 72 grams (0.5 mole) of trichloroacetonitrile and 26 grams (0.25 mole) of benzonitrile cooled in ice and salt until the liquid was saturated. Crystallization began after about 12 hours and was completed in two to three days. The hydrogen chloride was removed by suction and the crystals were recrystallized from ethanol. The product, 2-phenyl-4,6-bis-trichloromethyl-1,3,5-triazine represented a 56.5 percent conversion of the reactants, an appreciable amount of which were recovered and reused. The product formed in large white needles having a melting point of 97 to 98° C.

A mixture of 11 grams of 2-phenyl-4,6-bis-trichloromethyl-1,3,5-triazine and 30 ml. of concentrated 28 percent aqueous ammonia was shaken for two hours at 40–50° C. The mixture was filtered and the cake recrystallized from a mixture of equal parts of acetone and water. The product, 2-phenyl-4-trichloromethyl-6-amino-1,3,5-triazine, amounted to 7.35 grams (90.5 percent of theoretical), formed long white needles and melted at 175° to 176° C. Analysis showed 19.47 percent nitrogen and 35.78 percent chlorine compared with theoretical values of 19.35 percent nitrogen and 36.74 percent chlorine.

*Example IV*

A mixture containing 20.5 grams of melamine and 61.5 grams of formaldehyde (36 percent) was heated under reflux up to 155–160° C. for 10 minutes, then poured into shallow molds and heated in an oven at 80° C. for 20 hours. The product was a hard, white, translucent resinous material. When treated with lacquer solvents as ethylacetate, amylacetate, xylene, or nitrobenzene the product swelled and became soft and sticky.

When a mixture containing 17.4 grams of melamine, 3.1 grams of 2-phenyl-4-trichloromethyl-6-amino-1,3,5-triazine, and 61.5 grams of formaldehyde (36 percent) was heated under a reflux condenser up to 155–160° C. for 10 minutes, the solution changed to a white solid, which was cured by heating in an oven at 80° C. for 20 hours. The product was a hard, white, translucent resinous material differing from that obtained in the preceding paragraph in that it was completely insoluble in the lacquer solvents listed.

This application is a continuation in part of our application Serial No. 322,811, filed November 26, 1952, now abandoned.

We claim:
1. As new compositions, compounds of the generic formula

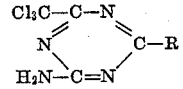

in which R is selected from the group consisting of lower alkyl and lower aryl hydrocarbon radicals.
2. 2-phenyl-4-trichloromethyl-6-amino-1,3,5-triazine.
3. 2-methyl-4-trichloromethyl-6-amino-1,3,5-triazine.

References Cited in the file of this patent
FOREIGN PATENTS 682,391    Germany _____ Oct. 13, 1939

OTHER REFERENCES

Beilstein: 1937, 4th ed., vol. 26, page 154.
Weddige: Journ. f. prakt. Chemie N. F. Bd. 33 (1886), pages 81–82.